Patented Dec. 28, 1937

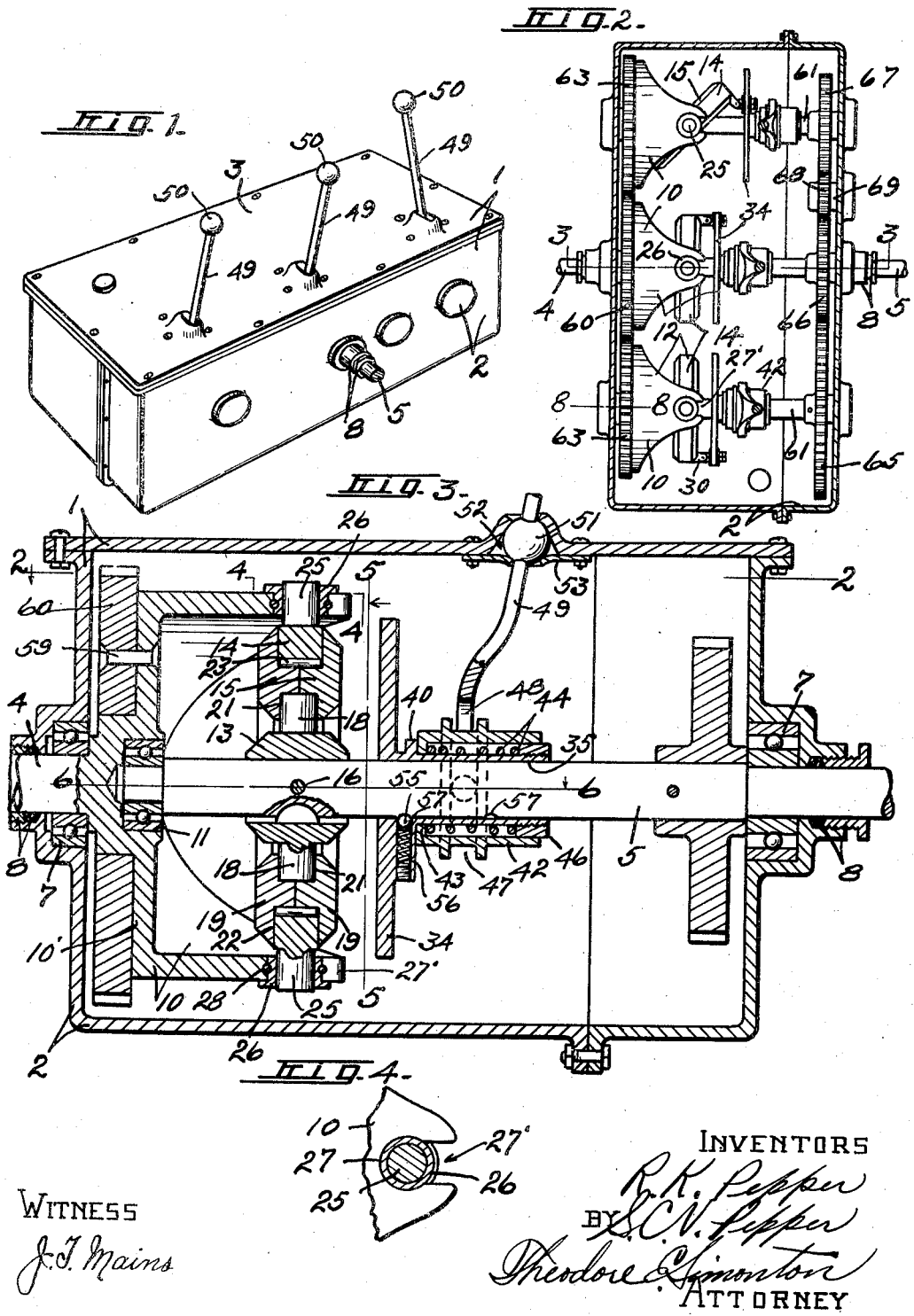

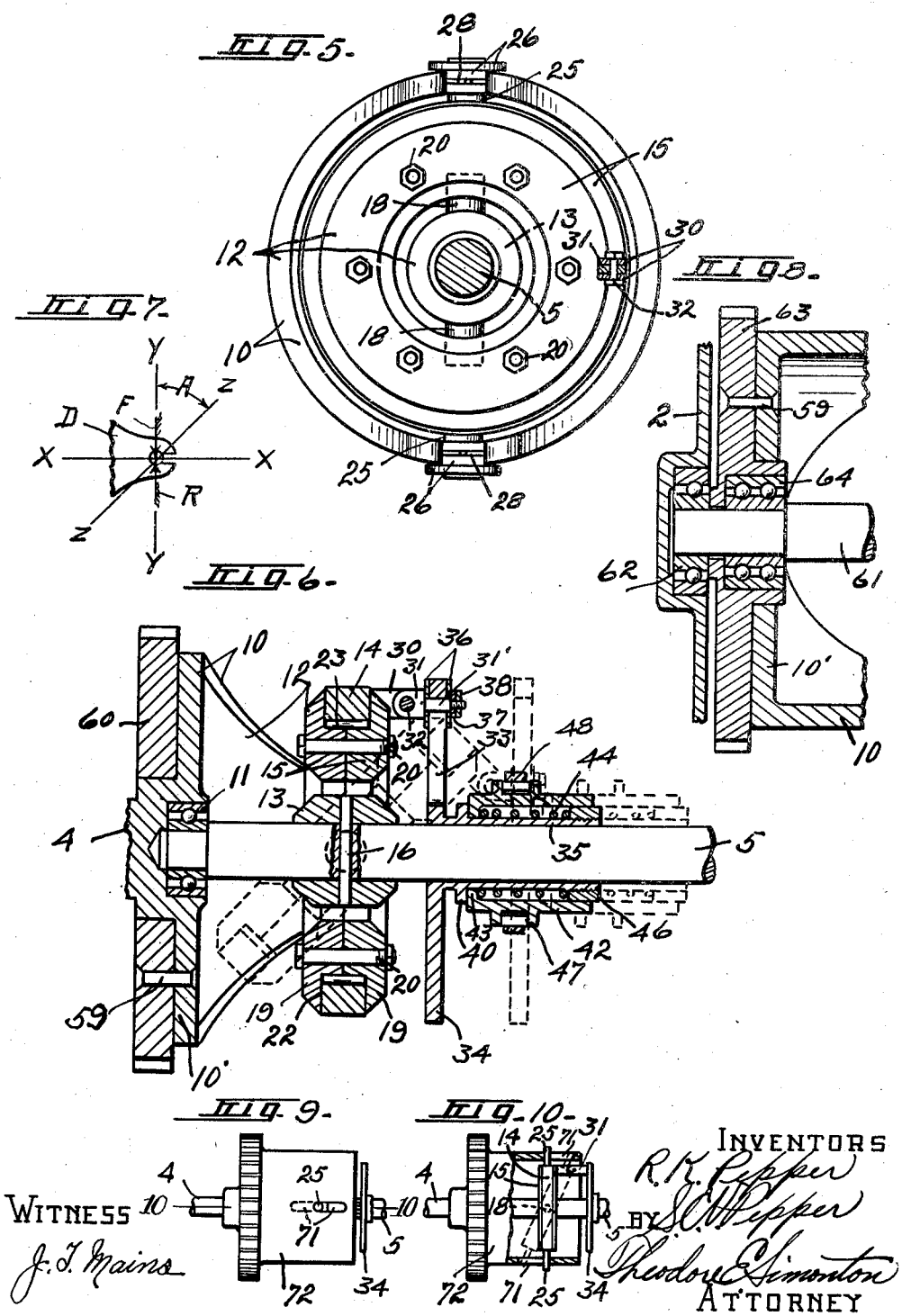

2,103,791

UNITED STATES PATENT OFFICE 2,103,791

POWER TRANSMISSION APPARATUS

Robert K. Pepper and Samuel C. V. Pepper, Syracuse, N. Y.

Application May 21, 1935, Serial No. 22,665

5 Claims. (Cl. 192—30)

This invention relates to a power transmission apparatus and pertains more particularly to a clutch or coupling mechanism for operatively connecting and disconnecting the drive and driven elements.

In the operation of large heavy machinery such as commonly used in road building or other large contract work such as tractors, locomotive cranes, power operated shovels or the like, and particularly in all cases where the source of power is derived from units not easily, or adapted to be, operated in a reverse direction such as steam turbines, Diesel engines, and so forth, it has heretofore been customary, insofar as the applicants are aware, to incorporate in the transmission mechanism positive clutches having elements movable relatively toward and from each other into and out of clutching engagement such as the common jaw clutch. These jaw clutches are very unsatisfactory to operate for the reason that it is difficult and sometimes impossible to bring the clutch elements into clutching engagement with each other while the drive unit is in operation. Thus, it is often necessary to entirely stop the operation of the drive unit or to reduce the speed of operation thereof to such an extent as to greatly impair the efficiency of the operation of the device and for the further reason that the teeth of the jaw clutch elements are of short life, requiring frequent replacement, which is very costly both in time and labor.

The main object of this invention is to provide a simply constructed and operated power drive mechanism, peculiarly adapted for use with internal combustion engines, steam turbines or the like, which depend upon a relatively high speed to obtain maximum efficiency.

Another object of the invention is to provide a power transmission mechanism having incorporated therein a positive clutch mechanism which may be quickly and easily moved into and out of the clutching position without discontinuing or excessively retarding the operation of the drive unit.

Another object of the invention is to provide a power transmission apparatus of the above mentioned class having a clutch mechanism adapted to be encased in a lubricant or which will be equally effective whether exposed to water or other liquids or when operating as a dry clutch.

A further object is to produce a positive clutch mechanism including clutch elements permanently connected to permit relative movement thereof in one plane as when in the declutching position and to cause the same to move in unison in another plane as when being moved to and from the clutching position and which, when in the idling or de-clutching position, will operate with a minimum amount of friction.

A still further object of the invention is to provide a clutch mechanism for a power transmission apparatus which is simple, durable, and economical in construction and operation.

Furthermore, we have provided a simply constructed clutch mechanism comprising relatively movable members which are always maintained in predetermined relationship with each other and which are moved in unison relatively to the drive and driven members to bring the same into and out of the clutching position, thereby producing a positive clutch means which may be as readily operated when the drive member is in operation as when said member is at rest.

Other objects and advantages pertaining to the construction of the device and to the form and relation of the parts thereof will more fully appear from the following description taken in connection with the accompanying drawings in which:

Figure 1 is a perspective view of a power transmission apparatus embodying the various features of this invention.

Figure 2 is a horizontal sectional view taken through the upper portion of the transmission case substantially in the plane of the line 2—2, Figure 3.

Figure 3 is a vertical sectional view taken on line 3—3, Figure 2, on an enlarged scale.

Figure 4 is a detail sectional view taken on line 4—4, Figure 3.

Figure 5 is a transverse sectional view taken on line 5—5, Figure 3, illustrating the major portion of our novel clutch mechanism in elevation.

Figure 6 is a detail longitudinal sectional view taken substantially at right angles to the view illustrated in Figure 3, upon line 6—6 of said figure.

Figure 7 is a diagrammatic view illustrating the principle of operation of the clutch elements.

Figure 8 is a detail vertical sectional view taken on line 8—8, Figure 2.

Figure 9 is a plan view on a reduced scale of a modified form of clutch mechanism.

Figure 10 is a sectional view, partly in elevation, taken substantially on line 10—10, Figure 9.

As shown in the drawings, our novel power transmission apparatus preferably comprises a substantially liquid or oil-tight case or housing 1 including a body portion 2 and a cover 3 removably secured to the upper side of the body 2. A drive shaft 4 and a driven shaft 5 are mounted in the case 1 in co-axial alignment. The shafts may each, as shown, be journaled in suitable rolling bearing members 7 mounted in any suitable manner in the wall of the case 1, while stuffing boxes 8 may be provided for each shaft for preventing the escape of lubricant from the interior of the case about the respective shafts. The drive shaft 4 may be connected with any suitable source of power such as a steam turbine, an internal combustion engine or the like, and has the inner end thereof terminating a short distance, in this instance within the case 1, and is provided with a clutch drive member 10, which, in this instance, is in the form of a yoke or cup-shaped element and which may be secured to or made integral with the drive shaft 4. The driven shaft 5 is shown as extending inwardly through the case 1 and has the inner end thereof journaled in a suitable bearing 11 provided in the inner end of the shaft 4 or the adjacent portion of the clutch drive member 10. Our novel clutch mechanism as 12 comprises primarily the clutch drive member 10, a clutch driven member or collar 13 and male and female clutch elements or rings 14 and 15 respectively.

The collar 13 is shown as being secured to the driven shaft 5 by means of a pin 16 so that said collar and shaft will rotate in unison. It is obvious, however, that the collar may be made integral with the shaft when so desired. The collar 13 is provided with a pair of diametrically opposed outwardly extending studs or trunnions 18 which may be secured thereto or made integral therewith. The female clutch element, in this instance, comprises two similarly constructed ring sections 19 which are secured together side by side by a plurality of, in this instance, six bolts or their equivalents 20 arranged in uniform circumferential spaced relation intermediate the outer and inner peripheral surface thereof. This female clutch element 15 is provided with a pair of diametrically opposed recesses 21 which extend inwardly from the inner periphery thereof and adapted to rotatably receive therein a respective trunnion 18. The clutch element 15 is also provided with an annular recess or channel 22 in the outer periphery thereof adapted to rotatably receive therein the male clutch element 14 which, in this instance, has the outer periphery thereof of substantially the same diameter as the outer periphery of the clutch element 15, but is of slightly less depth or radial width than the channel 22. Mounted in the bottom of the channel 22 intermediate the clutch elements 14 and 15 are a multiplicity of rolling members 23 which, in this instance, are in the form of rollers adapted to rotatably support the outer or male clutch element 14 during the relative rotary movement of the clutch elements as when said elements are in the neutral or declutching position.

The male clutch element 14 is provided with a pair of diametrically opposed outwardly extending trunnions 25 which may be secured to or made integral with said clutch element. These trunnions extend outwardly from the clutching element 14 into respective bushings 26 which are mounted in the inner portion of the clutch drive member 10 in the following manner:

The peripheral wall of the clutch drive member or housing 10 is provided with a pair of diametrically opposed holes or apertures 27 of substantially the same diameter as the body portion of the bushings 26. These apertures 27 are arranged in spaced relation to the inner side edge of the drive member 10 and are connected therewith by reduced neck portions 27' which are substantially the same width as the diameter of the trunnions 25. When assembling the clutch element 14 in the drive member 10 the trunnions are first inserted through the mouth portions 27' into the apertures 27, after which the bushings 26 are inserted in the apertures over the trunnions 25. The bushings may be maintained in the apertures 27 by any suitable means as by a split ring 28 mounted in an annular groove provided in the periphery of the body portion of each bushing and which are adapted to register in corresponding annular grooves formed in the wall of each aperture 27 as will be readily understood. In order that the clutch elements 14 and 15 may be moved into and out of clutching position, the clutch ring section 19 facing the interior of the case 1 is provided adjacent the outer periphery thereof with a pair of laterally disposed ears or lugs 30 which are arranged in a plane extending substantially at right angles to the plane of the trunnion recesses 21.

Mounted between the lugs 30 is a shouldered stud 31 which is pivotally connected with the ears by means of a pin 32 which is mounted in registering apertures or holes provided in the stud and ears. The stud 31 is provided with a reduced cylindrical portion 31' which extends through an elongated radially disposed slot 33 provided in an annular flange or plate 34 secured to or made integral with a sleeve 35 which is slidably mounted upon the driven shaft 5. The length of the cylindrical portion 31' of the stud 31 is slightly greater than the width of the plate 34 and has mounted thereon a pair of wear shoes or washers 36 positioned one adjacent either face of the plate 34. The stud 31 and shoes 36 are secured to the plate 34 by means of a nut 37 screw threaded on the outer reduced end of the stud 31 which is of slightly less diameter than the cylindrical portion 31' so that when the nut 37 is tightly screw threaded against the cylindrical portion 31' the stud will be securely connected to the plate 34 and at the same time have a free sliding movement relative thereto. The nut 37 may be secured in the holding position by any suitable means as a lock nut 38. The sleeve 35 is also provided with an outwardly extending flange 40 of slightly greater diameter than that of the sleeve 35 and which is positioned in slightly spaced relation to the plate 34. Mounted upon the sleeve 35 is a second sleeve 42 of greater interior diameter than the exterior diameter of the sleeve 35. The forward or inner end of the sleeve 42 is provided with an inwardly extending annular flange 43 which is adapted to freely slide over the sleeve 35 and is normally held into engagement with the flange 40 by means of a coil spring 44 mounted upon the sleeve 35 between the flange 43 and a nut 46 screw threaded on the outer end of the sleeve 35.

The sleeve 42 is provided with an annular recess or groove 47 in the outer periphery thereof intermediate its ends. In the groove 47 is positioned the forked or bifurcated end 48 of an operating lever 49. This lever extends upwardly from the sleeves 35 and 42 through the cover 3 and has the upper end thereof provided with a spherical handle 50 by which the lever may be manually actuated. The lever 49 also comprises a spherical portion 51 secured to or made integral therewith and which is adapted to be received in a circular recess 52 provided in the cover 3 as illustrated in Figure 3. The ball or bearing member 51 is operatively maintained in the recess 52 by a retainer plate 53 which is secured by screws or other suitable means to the lower face of the cover 3.

It will now be readily understood that by rocking the upper end of the lever 50 toward or from the drive shaft 4, that a corresponding sliding movement of the sleeve 42 will be produced axially of the driven shaft 5. This sliding movement of the sleeve 42 will be transmitted to the sleeve 35 and plate 34 through the medium of the spring 44 and it is obvious that as the plate 34 is moved axially along the shaft 5 toward and from the trunnions 18 and 25 the clutch elements 14 and 15 will be rocked in unison thereby about the axes of the trunnions 18 and 25 as a pivot when said trunnions are in or approaching substantially the same diametrical plane as illustrated in Figure 5.

In order that the sleeves 35 and 42 may be releasably maintained in either of two extreme positions against vibratory movement, the sleeve 35 is provided with a spring-pressed ball 55 mounted in a radially disposed recess 56 provided at one side of the plate 34, said ball being adapted to engage one or the other of a pair of axially spaced semi-circular recesses 57 provided in the periphery of the driven shaft 5 as illustrated in Figure 3.

It will now be understood that when the clutch elements 14 and 15 are in a position substantially normal to the axis of movement of the drive shaft 4 and driven shaft 5 as illustrated by full lines in Figures 3 and 6, the drive clutch element 14 will freely rotate about the driven clutch element 15, thereby permitting free relative rotary movement of the drive and driven shafts. Furthermore, it will be observed that this relative rotation of the clutch elements will be effected with a minimum amount of friction, due to the fact that these elements may efficaciously be operated in oil, and also due to the provision of the rolling bearing members 23 intermediate the clutch elements. It is to be understood, however, that the bearing members 23 may be dispensed with without materially affecting the operation of the clutch elements, particularly where the transmission is of relatively light structure, but when the mechanism is built relatively large and strong for heavy duty work, these bearing members are preferably used to reduce the friction between the clutch elements during the relative rotary movement thereof, inasmuch as the elements are supported one upon the other.

Considering now that the clutch elements or rings 14 and 15 are in the de-clutching position, as shown by full lines in Figure 6, the drive shaft and clutch member 10 connected therewith are being rotated, then when the lever 49 is rocked about its pivot 51 to move the sleeve 42 in a direction away from the clutch elements 14 and 15, the tension thus produced upon the spring 44 will be transmitted to the inner sleeve 35 and to that side of the clutch element 15 to which the stud 31 is attached, thereby urging the element 15 to swing about the trunnions 18 as a pivot from a position normal to the axis of the driven shaft 5 to an inclined position at an angle thereto. This swinging or pivotal movement of the clutch element 15 and also of the clutch element 14 will, of course, not take place if and when the trunnions 18 and 25 of said elements are in a position substantially at right angles to each other. However, as these trunnions approach or reach an aligned position, as indicated in Figure 5 during the relative rotation thereof, it is apparent that the clutch elements 14 and 15 will be free to swing to an inclined angular position relative to the axis of movement of the clutch members 10 and 13, or shafts 4 and 5.

It has been found by experimentation that the degree of this swinging movement of the clutch elements to effect a direct drive therethrough from one clutch member 10 or 13 to the other, may vary within certain limits. It is, however, preferable that the clutch elements or rings be inclined at an angle of substantially 45 degrees to the normal when in the clutching or operative position, because in this position there is no danger of the elements being moved by vibratory movement from the clutching position to the de-clutching position, and at the same time it is not difficult to return the elements to the normal de-clutching position regardless of the load produced thereon.

The reason for the relatively easy manner in which the clutch elements or rings may be moved to and from the clutching position seems to be due to the following operation of the parts which may possibly be more readily understood by referring to Figure 7 in connection with the structure shown in Figures 3, 5, and 6. In Figure 7 the line X—X represents the axis of rotation of the drive and driven members and the clutch elements or rings 14 and 15 connected therewith. The line Y—Y represents the plane normal to the axis of rotation of the clutch elements or rings occupied by said clutch elements when in the de-clutching or idling position. The line Z—Z represents the plane of inclination of the clutch elements when these members are in the clutching or operative position. D represents the drive clutch member as 10. The arrow F represents the force applied to the drive clutch element D. The arrow R represents the resistance offered by the driven clutch element and A the angle of travel of the clutch elements during the swinging movement thereof to and from the clutching position.

It will now be apparent that when the clutch elements 14 and 15 are in the inclined position represented by the line Z—Z and force is applied as at F, the line of direction of the force will tend to be diverted axially along the plane Z—Z due to the angular relation thereof to the normal line of direction of the force but as this axial movement or thrust of the force is opposed by the member D the line of force will be directed along the plane Y—Y. It thus follows that any tendency of the drive trunnions as 25 to move axially caused by the inclined relation of the clutch elements 14 and 15 to the normal path of movement of the trunnions will be opposed by the clutch drive member 10 so that rotation of the drive trunnions or pivots as 25 will be in a plane normal to the axis of rotation X—X with the result that motion is transmitted from the drive clutch element to the driven clutch element for producing rotation thereof in unison. Also, it will be understood that the greatest or nearly all the stress upon the clutch elements caused during the drive action therebetween occurs in the immediate vicinity of the pivots or trunnions 25 and 18 and that the nearer the axis of rotation X—X the line of inclination of the clutch elements as Z—Z approaches, the less is the tendency of the force applied to the elements to produce swinging of the clutch elements toward the plane Y—Y or line of travel of the force.

It has been found by actual practice that when the angle of inclination of the clutch elements approaches 45° to the axis of rotation thereof, the friction between the drive and driven elements or rings is more than sufficient to prevent said clutch elements being returned by the coaction of the driving force and the inclined relation of the clutch elements thereto to the idling position in a plane normal to the axis of rotation thereof. However, this friction between the clutch elements and between the pivots or trunnions 25 and 18 and the associated members insofar as has been determined, is never so much more than the action of the force tending to move the clutch elements from the inclined plane but that the rings are easily moved by applying a relatively small force to the side of the rings at right angles to the axis of swinging movement thereof as by the stud 31.

Furthermore, inasmuch as the clutch rings are not under load when in the idling or declutching position as when lying in the plane of the line Y—Y they are very easily swung about their inner and outer pivots 18 and 25, when said pivots are in or are nearly in co-axial alignment, from the idling or de-clutching position to the clutching or operative position.

In order that motion may be transmitted from the drive shaft 4 to the driven shaft 5 for producing rotation of the driven shaft in a direction opposite to that of the drive shaft or for producing rotation of the driven shaft at different speed from that of the drive shaft there is illustrated in Figure 2 a simple power transmission mechanism utilizing the novel clutch mechanism above described for producing these results. In the structure shown more particularly in Figures 2 and 3, it will be noted that the clutch drive member 10 is provided with a substantially flat end wall 10' to which is secured as by rivets 59 or their equivalent, a gear member 60. At each side of the driven shaft 5 is mounted a secondary drive shaft 61. The secondary shafts 61 are arranged in substantially parallel relation with each other and with the driven shaft 5 and have the ends thereof journaled in suitable bearings 62 provided in the wall of the case 1 as illustrated more clearly in Figure 8. Upon each shaft 61 at the end thereof adjacent the drive gear 60 is rotatably mounted a gear member 63. Each gear member 63 may, as shown in Figure 8, be mounted upon a rolling bearing 64 which, in turn, is mounted upon a reduced portion of the shaft 61. These gear members 63 are, as illustrated in Figure 2, substantially the same diameter as the gear 60 and are in constant meshing engagement with said latter gear.

To each of the gears 63 is secured a positive clutch mechanism constructed and operated in the manner described for the clutch mechanism 12 associated with the drive and driven shafts 4 and 5 so that motion may be transmitted from the gears 63 to the respective secondary shafts 61 as desired. To the opposite end of one of the secondary shafts 61 is secured a gear 65 which is of greater pitch diameter than the gear 63 associated with said shaft. This gear 65 is in meshing engagement with a gear 66 which is secured to the driven shaft 5 and which is of smaller pitch diameter than either the gear 65 or gears 60 and 63. To the other secondary shaft 61 is secured a gear member 67 of substantially the same pitch diameter as the gear 66 and which is operatively connected with said gear 66 through the medium of an idler gear 68 which is journaled on a stub shaft 69 secured to the adjacent portion of the wall of the case 1 in any suitable manner.

It will be obvious that the shaft 61 having the gear 65 connected therewith is an over-drive shaft by which the driven shaft 5 may be operated in the same direction as when driven directly by the drive shaft 4 but which will drive the driven shaft 5 at an increased speed over that of said drive shaft. Also, it will be noted that the other secondary shaft 61 and the mechanism associated therewith constitute a reverse drive by which the driven shaft 5 may be driven at the same speed of the drive shaft 4 but in the reverse direction from that of said drive shaft. It will now be obvious that inasmuch as the driven shaft 5 may be connected with any suitable mechanism said mechanism and the driven shaft may be operated from the drive shaft 4 either by direct drive or at an increased speed over that of the drive shaft or in a reverse direction to that of the drive shaft without retarding the speed of the drive shaft 4 or the power unit operating said drive shaft by merely manipulating one of the clutch mechanisms 12 depending upon the action desired.

While we have shown in Figure 2 a simple arrangement by which motion may be transmitted in various relations from a drive member to a driven member, it is to be understood that we do not wish to be limited to the exact construction shown therein or the arrangement of the parts thereof as it is obvious that many other combinations of shaft and gear arrangements may be readily provided for producing the required result. However, in each instance it will be noted that motion may not only be transmitted from the drive shaft to the driven shaft without retarding or completely stopping the operation of the drive shaft and the power unit connected therewith, but each gear member is always in meshing engagement with a cooperating gear member so that at no time is it necessary to engage or disengage one or more gear members, thereby providing a mechanism wherein the teeth of the gears may be constructed to the greater advantage to obtain a maximum efficiency both in power and in quietness of operation.

In Figures 9 and 10 there is illustrated a slight modification of our novel clutch mechanism as illustrated in the remaining figures. In the structure shown in these two figures the main difference or distinction lies in the fact that one of the sets of pivotal members or trunnions as 25 for the clutch elements or rings is mounted in corresponding elongated slots 71 provided in the respective clutch drive member as 72. These slots 71 extend from the plane extending through the other pivot members or trunnions as 18 substantially normal to the axis of rotation thereof in opposite directions parallel with the axis of the drive and driven shafts 4 and 5.

The advantage obtained by this construction over the construction described above for the clutch mechanism shown in Figures 3, 5, and 6 resides in the fact that the drive shaft 4 and drive clutch member 72 may be operating at a higher speed of rotation when the clutch elements or rings 14 and 15 are moved from the idle or de-clutched position to the clutch or operative position. This advantage is obtained by reason of the fact that the clutch elements or rings may be tilted or inclined relative to the axis of rotation of the driven shaft 5 when the sets of trunnions 25 and 18 are at right angles to each other, as illustrated by broken lines in Figure 10, thus eliminating the necessity of tilting the clutch elements only when said sets of trunnions are in coaxial alignment with each other.

When the clutch elements are swung to the position illustrated by broken lines in Figure 10 about the inner positioned trunnions 18 as an axis, there will be no clutching action between the clutch elements although said elements are in an inclined plane for the reason that the elements are free to rotate relative to each other due to the trunnions 25 being positioned at the outer ends of their respective slots 71. It, therefore, follows that the clutch elements 14 and 15 may easily be maintained in the inclined plane by pressure upon one of the clutch elements as through stud 31 during the succeeding substantially one-quarter revolution of the drive members 4 and 72. During this quarter of revolution, the trunnions 25 will travel along the inclined plane of the clutch elements and, in doing so, will freely move axially of the member 72 through the slots 71 until said trunnions reach the diametrical axis passing through the inner trunnions 18, at which position the outer trunnions 25 will be at the inner end of their respective slots in axial alignment with the inner trunnions 18.

Inasmuch as the outer trunnions are then at the inner ends of their respective slots, they will be maintained thereby against continued movement axially of the member 72 and be positively rotated by said member in a plane normal to the axis of shaft 5 even as when they are mounted in the manner shown in Figure 3. The clutch elements will thus be prevented from further rotary movement relative to each other while in the inclined plane so that they will then rotate in unison in a plane normal to the axis of rotation of shafts 4 and 5 and thereby positively transmit motion from the drive members to the driven members.

Although the construction and operation of the mechanism shown and described are particularly simple, practical, and efficient, we do not wish to be limited to the exact construction shown as it is evident that various changes may be made in the detailed construction without departing from the spirit of the invention as set forth in the appended claims.

We claim:

1. In a power transmission mechanism, the combination with a drive member and a driven member mounted in co-axial relation, a pair of co-acting clutch elements, means pivotally connecting each of said elements with a respective one of said members to move from a position substantially normal to the axis of movement of the members to an angular position inclined to said axis of movement, one of said pivotal means including diametrically disposed trunnions mounted for limited movement axially of the corresponding member from the diametrical plane passing through the other pivotal means to one side of said plane, whereby said clutch elements may be tilted when the pivotal means therefor are in angular relation to each other, stop means arranged concentric with the trunnions when said trunnions are in said diametrical plane of the other pivotal means for maintaining the trunnions against movement axially of the member in the opposite direction, whereby the clutch elements will be locked to each other and thus caused to move in unison when in the tilting position, and means for moving the elements from the first to the second position.

2. In a power transmission mechanism, the combination with a rotary drive member and a rotary driven member, a clutch element having a circular recess therein, a second clutch element rotatably mounted in said recess, means connected with each of the clutch elements at diametrically opposite sides thereof for pivotally connecting the same to a respective one of said members, means for rocking the clutch elements from a position substantially normal to the axis of movement of the drive and driven members to a position inclined at an angle to said axis of movement whereby the clutch elements will be moved from an inoperative position where said elements may rotate relative to each other to an operative position where the elements are maintained against said relative movement so that motion is positively transmitted from the drive element to the driven element, and rolling members mounted in said recess between said clutch elements whereby said clutch elements will operate freely during said relative rotary movement thereof.

3. In a power transmission mechanism, the combination with a rotary drive member and a rotary driven member, of a pair of coacting clutch elements, the first of said clutch elements being mounted on one of the members for tilting movement about a fixed axis, separate means including a pair of diametrically disposed trunnions connecting the second clutch element to the other member to permit tilting action of said clutch element in unison with the first clutch element, said trunnions being slidably connected with the corresponding member for axial movement relative thereto in one direction to permit tilting of the clutch element when said trunnions are in angular relation to the axis of tilting movement of the first clutch element, and means for maintaining the trunnions in co-axial alignment with the first mentioned pivotal means against axial movement relative to said member in the opposite direction to effect locking of the clutch elements to each other when said elements are in the tilting position.

4. In a power transmission mechanism, in combination, a drive member and a driven member mounted in co-axial relation therewith, a pair of relatively movable clutch elements, means including a single pair of diametrically opposed trunnions pivotally connecting one of the clutch elements with one of the members, means including a second single pair of diametrically opposed trunnions pivotally connecting the remaining clutch element and member to each other, one of said pairs of trunnions being mounted in corresponding elongated guide slots provided in the corresponding member, said slots extending in opposite directions from the plane passing through the other trunnions normal to the axis of movement of the drive and driven members to provide for a limited movement of the trunnions axially of the corresponding member, and means for rocking the clutch elements about the trunnions as pivots to bring them into and out of clutch relation.

5. In a power transmission mechanism, the combination with a rotary drive member and a rotary driven member, of a pair of co-acting clutch elements, the first of said clutch elements being mounted on one of the members for tilting movement about a fixed axis, separate means associated with the remaining clutch element and member co-acting to pivotally connect the same to each other including a trunnion and guide means therefor extending axially of the member whereby the clutch element is free to tilt in unison with the first clutch element when said trunnion is positioned with the axis thereof normal to said fixed axis, stop means associated with the guide means and co-acting with the trunnion only when the clutch elements are in the tilted position and the axis of the trunnion is in alignment with said fixed axis to effect locking of the clutch elements to each other, and means for producing said tilting of the clutch elements.

ROBERT K. PEPPER.
SAMUEL C. V. PEPPER.